Oct. 12, 1965      R. E. DENNIS      3,211,156
LOOSE-LEAF BINDER
Filed Nov. 5, 1962      4 Sheets-Sheet 1

INVENTOR.
RALPH E. DENNIS
BY MAHONEY, MILLER & RAMBO
BY
ATTORNEYS

Oct. 12, 1965    R. E. DENNIS    3,211,156
LOOSE-LEAF BINDER
Filed Nov. 5, 1962    4 Sheets-Sheet 2
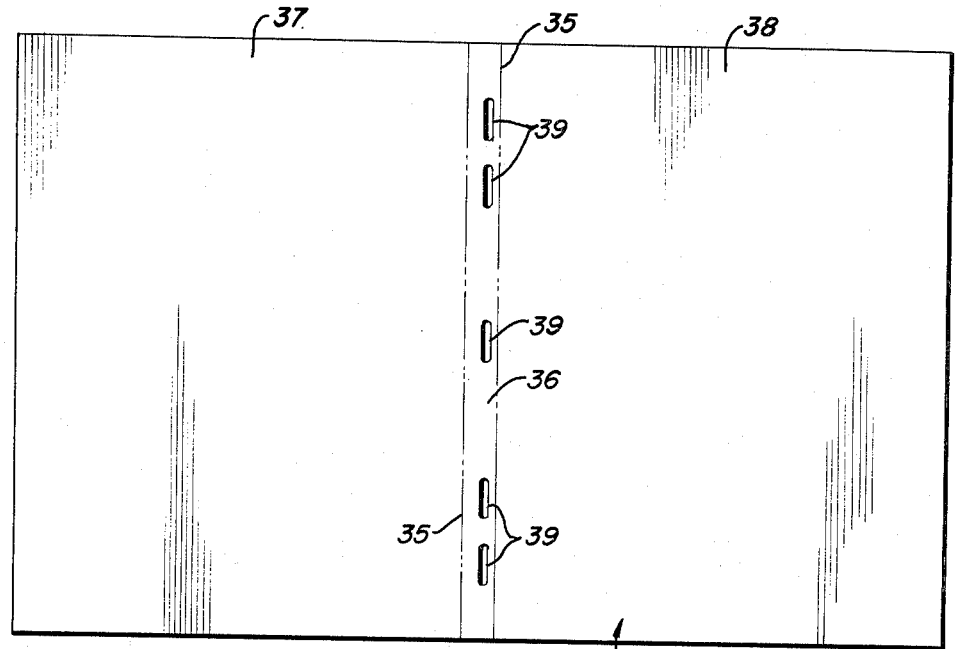
FIG. 4
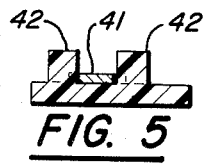
FIG. 5
FIG. 7
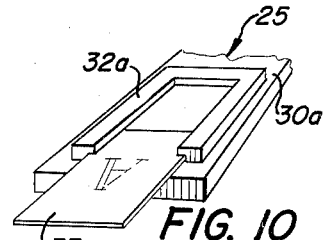
FIG. 10
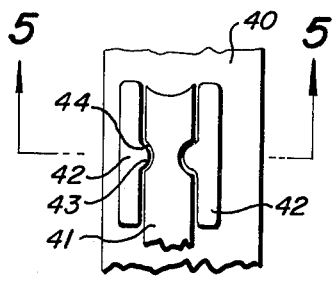
FIG. 6
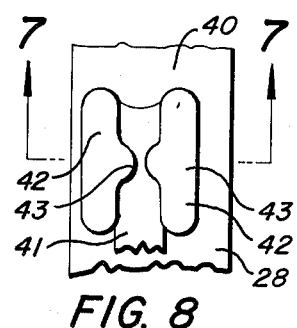
FIG. 8
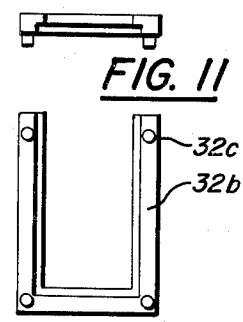
FIG. 11
FIG. 12
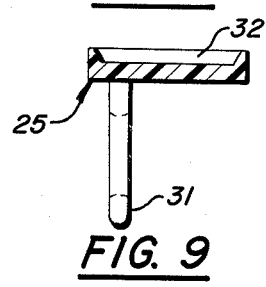
FIG. 9
INVENTOR.
RALPH E. DENNIS
BY MAHONEY, MILLER & RAMBO
BY
ATTORNEYS

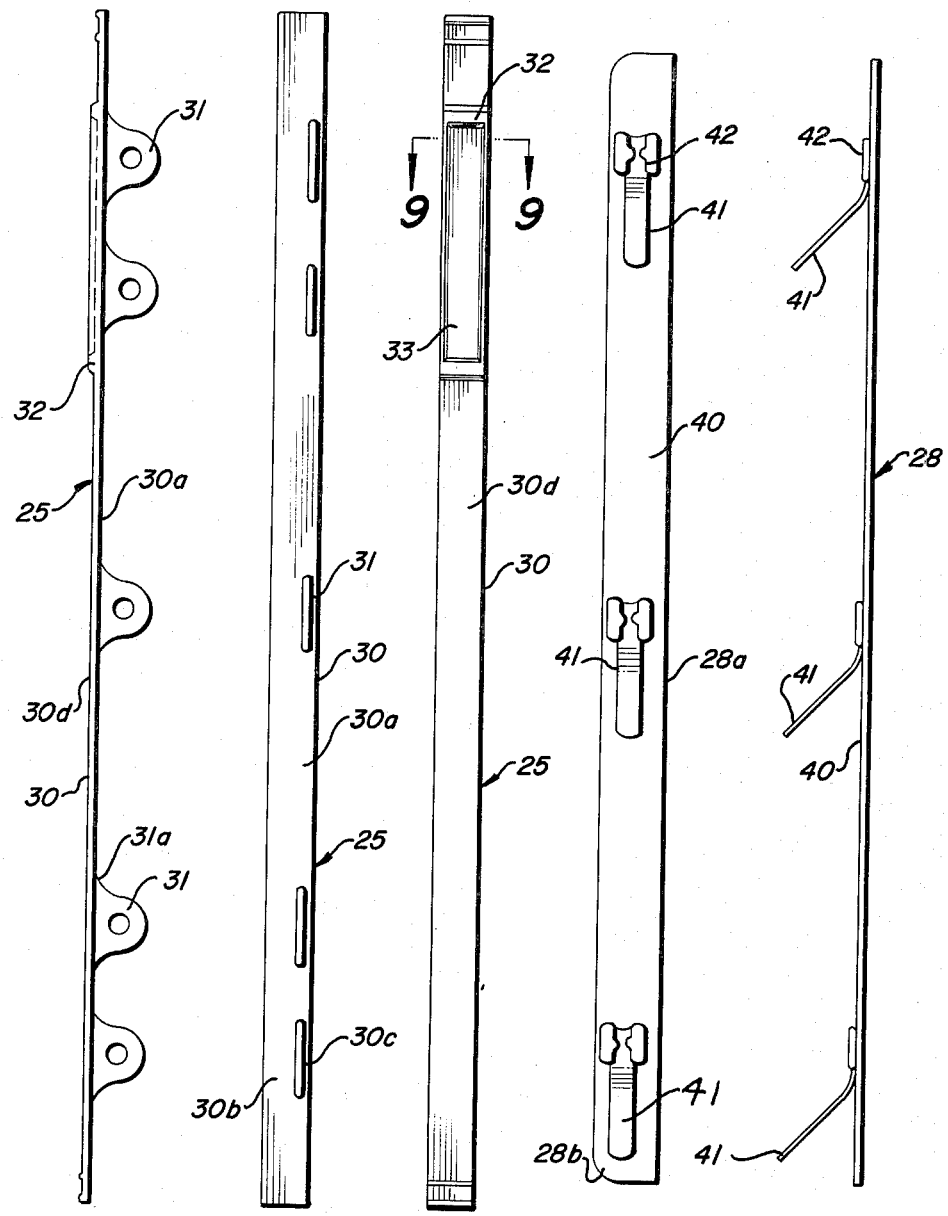

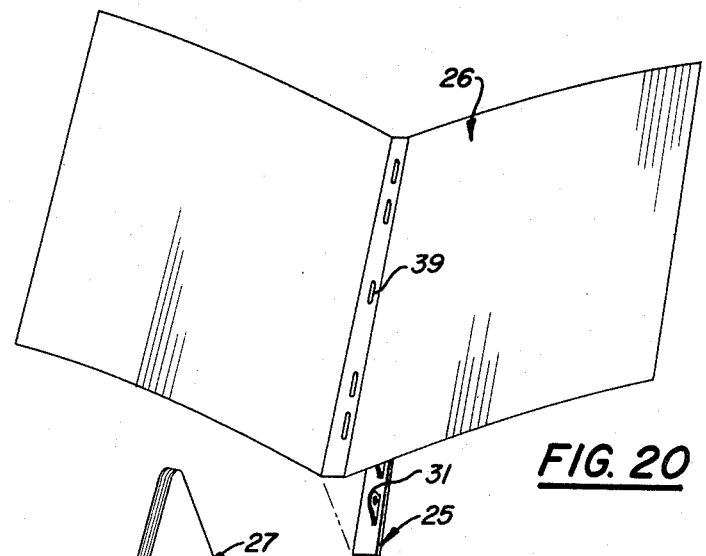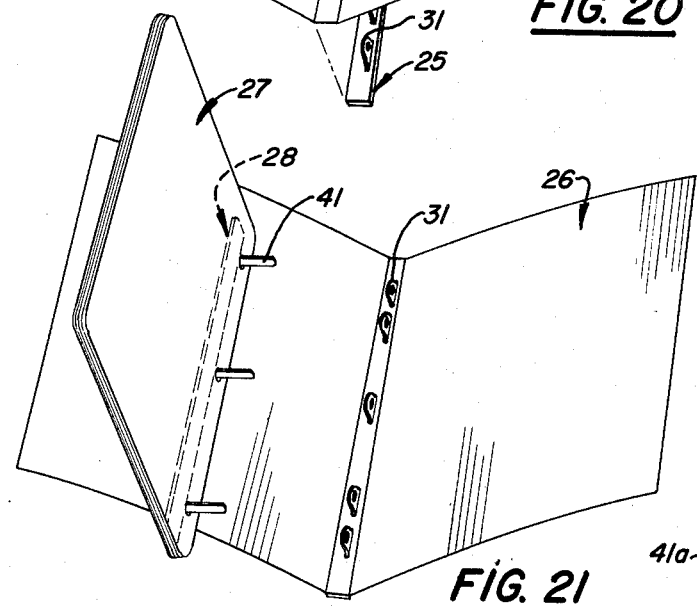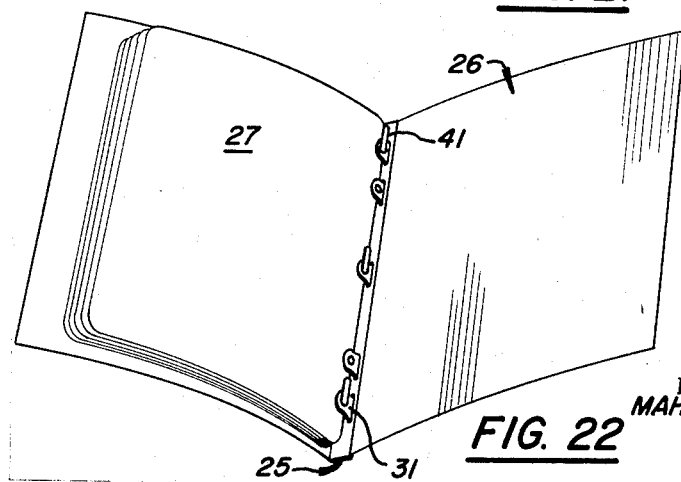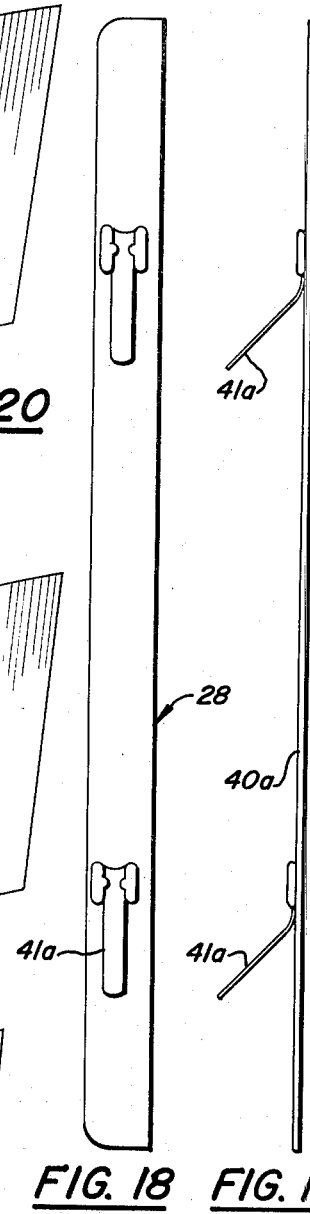

United States Patent Office 3,211,156
Patented Oct. 12, 1965

3,211,156
LOOSE-LEAF BINDER
Ralph E. Dennis, Columbus, Ohio, assignor to Bindematic Corporation, Columbus, Ohio, a corporation of Ohio
Filed Nov. 5, 1962, Ser. No. 235,438
4 Claims. (Cl. 129—25)

This application is a continuation-in-part of my pending application Serial No. 170,630 filed February 2, 1962, now abandoned.

My invention relates to a loose-leaf binder. It has to do, more particularly, with a binder assembly including a one-piece cover and means for securing loose-leaf sheets within the cover in such a manner that the sheets can be removed or replaced readily or additional sheets can be inserted.

My invention deals particularly with that type of loose-leaf binder known generally as the post-type where post-like retaining members or tongues extend transversely through aligning openings formed in the loose-leaf sheets. Many variations of this post-type binder have been used in the prior art but all of them have had certain undesirable features, for example, they do not always securely hold the loose-leaf sheets without tearing. Also, it is sometimes difficult to remove and replace the posts which secure the loose-leaf sheets between the cover. Moreover, it is difficult to remove and replace the cover as desired. Furthermore, this type binder usually does not have a face or surface at the bound or outer edge upon which identification or advertising indicia can be effectively and attractively applied. Also, most prior art binders of this general type do not have sufficient rigidity at the bound edge to permit them to be filed in upright position and yet have flexible cover leaves which make them easier to handle and use.

According to the present invention, I provide a binder which includes a backbone of elongated form which is the main supporting member for the loose-leaf members, both cover and sheets. This backbone is of such a nature that the cover which cooperates therewith can be of one piece, with a central hinge flap or flange and opposed cover leaves or panels. The backbone is provided with ring portions which extend through openings in the hinge flap between the opposed panels or leaves of the cover and which cooperate with posts or tongues on a transfer bar to retain the cover in association with the backbone. The tongues also extend transversely through openings in loose-leaf sheets for fastening the sheets to the rings of the backbone. The transfer bar, when mounted on the backbone, engages the hinge flap of the one-piece cover and keeps it snugly against the inner surface of the backbone. The outer surface of the backbone is exposed and can have indicia attractively displayed thereon. Although the cover panels are desirably flexible, the backbone and associated transfer bar give the binder sufficient rigidity that it can be filed standing up with the outer face of the backbone exposed.

Various other objects and advantages will be apparent as this description progresses.

The preferred embodiment of my invention is illustrated in the accompanying drawings but it is to be understood that specific details thereof may be varied without departing from basic principles.

In these drawings:

FIGURE 4 is a plan view of the one-piece cover.

FIGURE 5 is a transverse sectional view taken along line 5—5 of FIGURE 6 showing one step in attaching the fastening posts or tongues to the transfer bar.

FIGURE 6 is a plan view illustrating the same step.

FIGURE 7 is a transverse sectional view taken along line 7—7 of FIGURE 8 showing the next step in attaching the tongues to the bar.

FIGURE 8 is a plan view illustrating the second step.

FIGURE 9 is an enlarged, transverse, sectional view taken through the backbone of the binder substantially along line 9—9 of FIGURE 15, and illustrating an identification label-receiving pocket thereon.

FIGURE 10 is a detail in perspective illustrating a different protective frame on the backbone which can receive an identification label.

FIGURE 11 is an end elevational view illustrating the pocket frame as a separate member from the backbone.

FIGURE 12 is a plan view of the inner side of the frame.

FIGURE 13 is an edge view of the backbone of the binder.

FIGURE 14 is a plan view of the ring side or face of the backbone.

FIGURE 15 is a view of the outer face of the backbone.

FIGURE 16 is a view of the tongue-carrying side of the transfer bar of the binder, the bar having three tongues.

FIGURE 17 is an edge view of the transfer bar of FIGURE 16.

FIGURE 18 is a view similar to FIGURE 16 but showing two tongues on the bar.

FIGURE 19 is an edge view of the bar of FIGURE 18.

FIGURE 20 is a schematic view illustrating an initial step in assembling the binder, whereby the cover is positioned on the backbone.

FIGURE 21 illustrates a later step in which the loose-leaf sheets and transfer bar are assembled.

FIGURE 22 illustrates the final assembly of the backbone, cover, loose-leaf sheets, and transfer bar.

Figure 1:
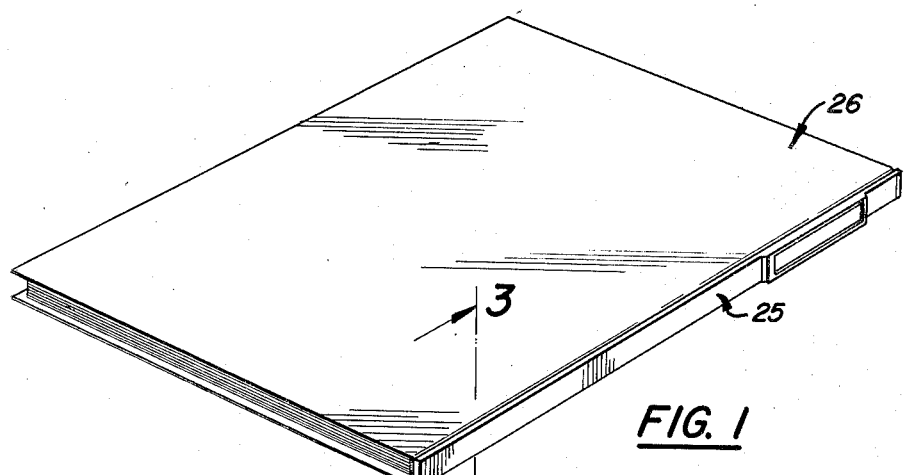
FIGURE 1 is a perspective view of an assembled binder with the loose-leaf sheets and cover assembled on the backbone, the cover being closed.
Figure 2:
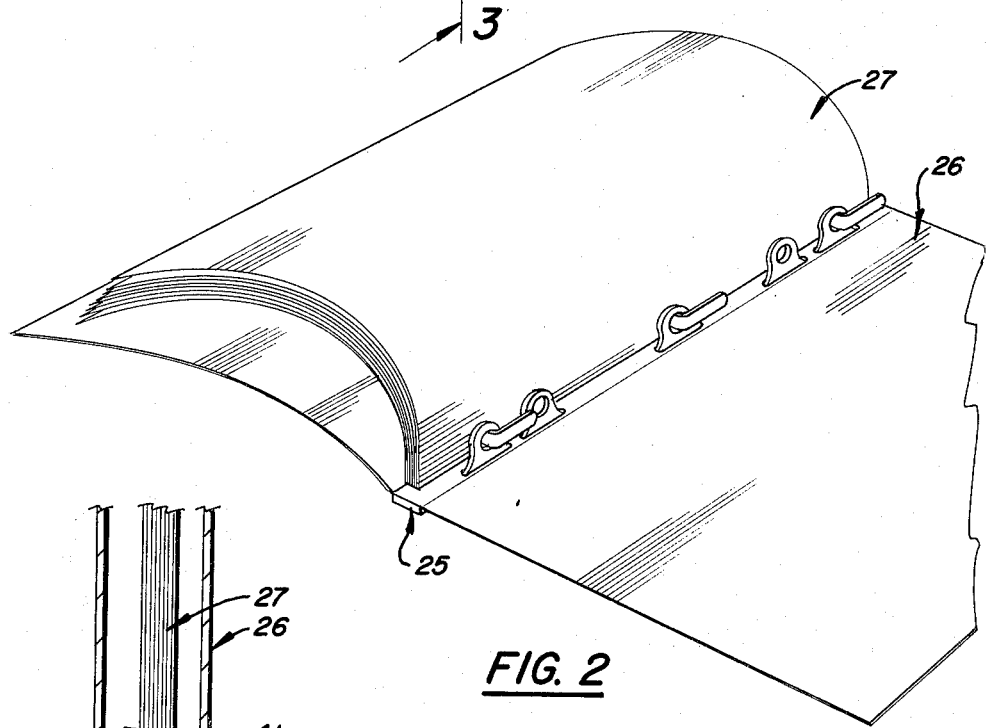
FIGURE 2 is a perspective view of the assembled binder and loose-leaf sheets with the cover in open position.
Figure 3:
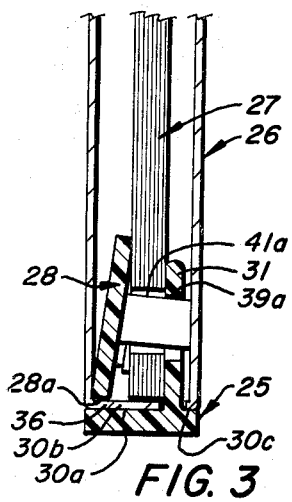
FIGURE 3 is an enlarged transverse sectional view taken along line 3—3 of FIGURE 1.

With reference to the drawings, and particularly to FIGURES 1 to 3, the complete binder assembly will consist of the backbone 25, the one-piece cover 26, the loose-leaf sheets 27 and the post or tongue-carrying transfer bar 28.

The backbone 25 can be formed from metal or plastic or other suitable rigid material. It is of such a shape that it can be molded readily from various materials, such as plastic or metal. The specific structure of the backbone is illustrated best in FIGURES 13, 14 and 15.

It will be noted that the backbone 25 includes a main support in the form of an elongated strip or body flange 30. On the inner surface of this flange inwardly projecting ring portions 31 are provided in longitudinally spaced relationship and have openings extending therethrough. These rings 31 may be provided in suitable number, five of them being shown in this example. These five are so longitudinally spaced that the backbone may be used for binding a group of loose-leaf sheets having either the standard three-hole punched arrangement or the standard two-hole punched arrangement. The ring projections 31 extend inwardly at right angles or normally to the inner surface 30a of the flange 30 and are disposed adjacent one edge thereof so that at one side of the rings there is a wider area 30b than at the other side thereof which lesser area is indicated at 30c. The outer surface 30d is flat throughout the greater portion of its area but adjacent one end thereof, which will preferably be at the upper end of the binder, there is a raised or embossed label-receiving pocket 32 (FIGURES 9 and 15) formed thereon. This pocket is formed by means of an integral frame and is adapted to provide an outwardly opening pocket for receiving an identification label 33 which may be suitably secured therein as by adhesive.

The cover 26 is of a one-piece type, as previously indicated, and is illustrated best in FIGURE 4. It is formed from a blank of suitable material folded along the two fold lines 35 which are parallel to each other and to the opposed end edges of the blank. They thus provide a central hinge flap or flange 36 and the opposed cover leaves or panels 37 and 38. This flange is of substantially the same width and length as the backbone flange 30. The cover 26 is preferably formed of some suitable flexible material such as paper, plastic, leather, or other flexible sheet material. The flange 36 is provided with suitable ring-receiving openings 39, which are properly spaced and are in proper number to cooperate with the rings 31 on the backbone 30. Also, it will be noted that these openings are at one side of the flange 36 so that they correspond with the location of the rings 31 on the flange 30. It will be noted that each of these ring projections 31 has shoulders 31a at its opposite edges adjacent its junction to the surface 30a. These will fit snugly in the cover openings 39 and prevent relative longitudinal movement of the cover flange 36 and the backbone flange 30.

FIGURES 10, 11 and 12 illustrate different ways in which a label-receiving pocket may be formed on the outer surface of the backbone 25. In the example shown in FIGURE 10, a pocket-frame 32a is formed integral with the flange 30a and provides undercut guides at its sides beneath which a label 33a may be slipped through an open end of the frame as indicated. The same type structure is illustrated in FIGURES 11 and 12 except that the frame 32b is made as a separate member and has the attaching pins 32c formed thereon for attaching to the backbone flange, for example, by embedding in the soft plastic material of the flange before it cures.

The transfer bar 28 is of elongated form and is slightly shorter than the flange 30 of the backbone. It may be of similar or different material as compared to the backbone but is of flat elongated bar form, with rounded outer corners 28b. On one of its surfaces 40, it carries a plurality of tongues 41 which are in the form of flexible deformable strips preferably of metal such as brass. In the example shown in FIGURES 16 and 17, three of these tongues are shown for cooperating with three of the openings 39 in the cover 38. However, in the example shown in FIGURES 18 and 19, two tongues 41a are provided on the inner surface 40a and these tongues are for cooperating with two of the openings of the cover.

The tongues 41 may be fastened to the bar 28 in various ways but assuming that the tongues are metal and the bar 28 is plastic, the steps illustrated in FIGURES 5–8 may be followed. The elongated spaced lugs 42 are molded on the surface 40 and the tongue 41 in the form of a flat strip of metal is positioned therebetween (FIGURES 5 and 6) resting on such surface. The lugs 42 are provided with opposed inwardly extending ears 43 which extend into notches 44 in the edges of the strips 41. The lugs 42 may then be flattened (FIGURES 7 and 8) to secure the inner ends of these strips 41 flat against the surface 40. However, the outer end of each strip is free and can be bent outwardly away from the surface 40. The material of the lugs 42 can be flattened before it is cured or with some soft plastic, even after it is cured.

In assembling the binder, the steps indicated in FIGURES 20–22 are preferably followed. First, as indicated in FIGURE 20, the backbone 25 is positioned to receive the cover 26 by slipping the openings 39 in the cover over the ring projections 31. Then, as indicated in FIGURE 21, the loose-leaf sheets 27 and transfer bar are assembled by passing the tongues 41 transversely through the openings in the group of loose-leaf sheets. The assembled loose-leaf sheets and transfer bar 28 are then disposed within the cover and attached to the backbone 25, as indicated in FIGURE 22. This is accomplished by passing the tongues 41 laterally or transversely through the ring projections 31, it being understood that at this time the tongues 41 are at right angles to the bar 28. After the tongues are passed through the rings 31, they are bent laterally parallel to their attached inner end portions and parallel to the inner surface of the bar 28. This will securely hold all parts of the binder together.

As indicated in FIGURE 3, the relationship of the transfer bar 28 and backbone 25 is such that the inner edge of the bar 28 will contact the inner surface of the hinge flange 36 of the cover. The bar 28 will be in tilted position relative to the rings 31 so that there will be a wedging action exerted on the hinge flange 36 as the tongues 41 are bent over into their final position. This wedging action will hold the cover flap or flange 36 tightly against the inner surface 30a of the backbone so that the cover flange is tightly held in position and therefore will not wrinkle or flex throughout its length. This arrangement results from having the outer edge 41a of each tongue spaced from the opposed edge 28a of the transfer bar a distance greater than the distance from the outer edge 39a of the cooperating ring opening 39 to the inner surface 30a of the backbone. The location of the rings 31 adjacent one edge of the flange 30 permits the positioning of the loose-leaf sheets 27 between the transfer bar 28 and the rings 31 and still provides ample area, the area 30b, against which the cover flange 36 is pressed by the bar 28.

It will be apparent from the above description that this binder is such that all parts will be effectively held together when assembled. However, disassembly can be accomplished with ease for removal or replacement of loose-leaf sheets. The backbone will provide a rigid bound edge on the assembly even though the cover panels are flexible. Furthermore, even though the cover material is flexible, its hinge flange will be neatly held against the backbone flange by the wedging action of the transfer bar cooperating with the backbone body or flange.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described my invention, what I claim is:

1. A loose-leaf binder assembly comprising a cover including an intermediate hinge flange having inner and outer faces and opposed cover panels hinged thereto at opposite longitudinal edges thereof, a backbone for receiving the cover and loose-leaf sheets, an elongated transfer bar for holding the backbone, the cover and the loose-leaf sheets in assembled relationship, said transfer bar having inner and outer faces and spaced longitudinal opposed edges, said backbone having inner and outer faces and opposed longitudinal edges, a plurality of projections spaced longitudinally on said backbone and projecting inwardly from the inner face thereof and having openings arranged transversely of that face, said cover hinge flange having openings extending therethrough and spaced longitudinally similar to the spacing of said projections and through which the projections pass to locate the transverse openings thereof inwardly of the inner face of the cover hinge flange, said cover hinge flange having its outer face engaging the adjacent inner face of said backbone, said transfer bar having a plurality of posts projecting from its inner face with the bar disposed longitudinally inwardly of the inner face of the cover hinge flange, the loose-leaf sheets being adapted to be positioned between said projections and said inner face of the transfer bar on the posts and having openings aligned with said openings in the projections, said posts being in the form of bendable tongues having outermost contact edges for engaging the outermost edges of said openings and the distance from the outermost edges of the openings in the projections to the inner face of the backbone being less than the distance from the outermost contact edges of the tongues to the inner longitudinal edge of the transfer bar so that such inner edge of the bar engages the inner face of said cover hinge flange to clamp it against the inner face of said backbone.

2. A loose-leaf binder according to claim 1 in which the projections on said backbone have shouldered edges which fit snugly into the cover hinge flange openings.

3. A loose-leaf binder according to claim 1 in which the openings in the cover hinge flange are offset adjacent to one of the longitudinal edges thereof, and the projections on the backbone are correspondingly offset adjacent to one of the longitudinal edges of the backbone.

4. A loose-leaf binder comprising a backbone for receiving loose-leaf sheets, an elongated transfer bar for mounting the sheets in assembled relationship on the backbone, said transfer bar having inner and outer faces and opposed longitudinal edges, said backbone having inner and outer faces and opposed longitudinal edges and a plurality of projections spaced longitudinally thereon which project inwardly from the inner face thereof and having openings arranged transversely of such face, said transfer bar having a plurality of posts projecting from the inner face thereof and passing through the transverse openings in said projections and having outermost contact surfaces for engaging with the openings at their outermost edges when the bar is disposed longitudinally of the backbone, the distance from said outermost edges of the openings in the projections to the inner face of the backbone being less than the distance from the outermost contact surfaces of the posts to the innermost longitudinal edge of the bar to provide for a clamping action between said innermost edge of the bar and said inner face of the backbone.

References Cited by the Examiner
UNITED STATES PATENTS

| | | | |
|---|---|---|---|
| 735,710 | 8/03 | Chiger | 129—25 |
| 1,807,390 | 5/31 | Crosby | 129—1 |
| 2,196,483 | 4/40 | Vaughan | 129—8 |

FOREIGN PATENTS 72,469    9/16    Austria.

JEROME SCHNALL, *Primary Examiner.*
LAWRENCE CHARLES, *Examiner.*